(12) United States Patent
Park et al.

(10) Patent No.: US 8,923,927 B2
(45) Date of Patent: Dec. 30, 2014

(54) APPARATUS AND METHOD FOR FORMING EVENT PICTURE IN MOBILE COMMUNICATION TERMINAL

(71) Applicant: Pantech Co., Ltd., Seoul (KR)

(72) Inventors: Sun Hyung Park, Kwangmyung (KR); Min Jung Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 3 days.

(21) Appl. No.: 13/972,475

(22) Filed: Aug. 21, 2013

(65) Prior Publication Data

US 2013/0337874 A1 Dec. 19, 2013

Related U.S. Application Data

(63) Continuation of application No. 13/052,836, filed on Mar. 21, 2011, now Pat. No. 8,532,626, which is a continuation of application No. 12/183,506, filed on Jul. 31, 2008, now Pat. No. 7,925,242, which is a continuation of application No. 11/354,608, filed on Feb. 14, 2006, now Pat. No. 7,420,566.

(30) Foreign Application Priority Data

Feb. 15, 2005 (KR) .................. 10-2005-0012498

(51) Int. Cl.
*H04B 1/38* (2006.01)
*H04M 1/725* (2006.01)
*H04W 68/00* (2009.01)

(52) U.S. Cl.
CPC .......... *H04W 68/00* (2013.01); *H04M 1/72522* (2013.01); *H04M 1/72544* (2013.01)
USPC .................. 455/567; 455/412.2; 455/566

(58) Field of Classification Search
USPC ......... 455/567, 550.1, 556.1, 466, 412.2, 566
See application file for complete search history.

(56) References Cited

U.S. PATENT DOCUMENTS 7,250,955 B1 * 7/2007 Beeman et al. ............... 345/592
7,420,566 B2 * 9/2008 Park et al. ..................... 345/522

(Continued)

FOREIGN PATENT DOCUMENTS

KR 10-2001-0017520 3/2001
KR 10-2002-0014109 2/2002

(Continued)

OTHER PUBLICATIONS

Notice of Allowance issued on Jun. 19, 2008 in U.S. Appl. No. 11/354,608.

(Continued)

*Primary Examiner* — April G Gonzales
(74) *Attorney, Agent, or Firm* — H.C. Park & Associates, PLC

(57) ABSTRACT

Disclosed are an apparatus and a method for forming an event picture in a mobile communication terminal. If an event such as call reception, alarm or message reception occurs while a service picture is displayed on a screen of the terminal, the current service picture is backed up, a command input through the buttons provided to the terminal is interrupted and the event picture is overlapped over the current service picture, thereby allowing a user to perceive the corresponding event. Accordingly, the terminal user can correctly perceive the event occurred during the service. In addition, when the event occurs, the command input through the buttons is interrupted, so that it is possible to prevent an unintended event processing or erroneous operation due to an erroneous button manipulation.

13 Claims, 3 Drawing Sheets

(56) References Cited

U.S. PATENT DOCUMENTS

| | | | |
|---|---|---|---|
| 7,580,702 B2* | 8/2009 | Othmer | 455/412.2 |
| 7,925,242 B2* | 4/2011 | Park et al. | 455/412.2 |
| 2002/0015481 A1* | 2/2002 | Abel et al. | 379/90.01 |
| 2003/0013484 A1* | 1/2003 | Nishimura et al. | 455/556 |
| 2003/0147514 A1* | 8/2003 | Ryu et al. | 379/93.23 |
| 2004/0179017 A1* | 9/2004 | Martyn et al. | 345/536 |
| 2004/0249565 A1* | 12/2004 | Park | 701/200 |
| 2005/0039135 A1* | 2/2005 | Othmer et al. | 715/774 |
| 2006/0061597 A1* | 3/2006 | Hui | 345/629 |
| 2006/0192684 A1* | 8/2006 | Kaoh | 340/815.53 |
| 2007/0042757 A1* | 2/2007 | Jung et al. | 455/412.2 |
| 2008/0132253 A1* | 6/2008 | Cho | 455/466 |

FOREIGN PATENT DOCUMENTS

| | | |
|---|---|---|
| KR | 10-2003-0034917 | 5/2003 |
| KR | 10-2004-0110219 | 12/2004 |

OTHER PUBLICATIONS

Non-Final Office Action issued on Jun. 28, 2010 in U.S. Appl. No. 12/183,506.

Notice of Allowance issued on Dec. 7, 2010 in U.S. Appl. No. 12/183,506.

Non-Final Office Action issued on May 26, 2011 in U.S. Appl. No. 13/052,836.

Non-Final Office Action issued on Dec. 20, 2011 in U.S. Appl. No. 13/052,836.

Final Office Action issued on Jul. 19, 2012 in U.S. Appl. No. 13/052,836.

Notice of Allowance issued on May 8, 2013 in U.S. Appl. No. 13/052,836.

* cited by examiner

APPARATUS AND METHOD FOR FORMING EVENT PICTURE IN MOBILE COMMUNICATION TERMINAL

CROSS-REFERENCE TO RELATED APPLICATIONS

This application is a continuation of U.S. patent application Ser. No. 13/052,836, filed on Mar. 21, 2011, which is a continuation of U.S. patent application Ser. No. 12/183,506, filed on Jul. 31, 2008, now issued as U.S. Pat. No. 7,925,242, which is a continuation of U.S. patent application Ser. No. 11/354,608, filed on Feb. 14, 2006, now issued as U.S. Pat. No. 7,420,566 and claims the benefit of and priority from Korean Patent Application No. 10-2005-0012498, filed Feb. 15, 2005, which are all hereby incorporated by reference for all purpose as if fully set forth herein.

BACKGROUND

1. Field of the Invention

The present invention relates to a formation of an event picture in a mobile communication terminal, and more particularly to an apparatus and a method for forming an event picture in a mobile communication terminal allowing a user to correctly perceive an occurrence of an event to prevent an erroneous operation when any event occurs under state that a service picture is displayed on a screen of the mobile communication terminal.

2. Description of the Prior Art

In recent years, as a mobile communication technology has been rapidly developed, many people use a mobile communication terminal such as PCS phone, cellular phone, PDA phone and the like. The mobile communication terminal provides a variety of additional services such as electronic diary, game, schedule management functions as well as an inherent communication service such as general voice communication, message communication, wireless internet communication and the like.

The mobile communication terminal is provided with a keypad comprising numbers, characters, various function buttons and the like as one of user interfaces. A user can select and use the communication services and the various additional services such as electronic diary, game and schedule management functions through a keypad operation.

However, according to the mobile communication terminal of the prior art, if any event such as call reception, alarm or message reception occurs while a user of the terminal operates command input buttons provided to the terminal for using the services, rather than a stand-by state, the terminal picture transitions to a picture for processing the occurred event. At this time, if the terminal user continuously operates the buttons to input a command without perceiving the event occurrence, an unintended event may be processed or an erroneous operation may occur.

SUMMARY

According to exemplary embodiments of the present invention, an event picture is overlapped over a current service picture to gradually display the event picture for allowing a user of a mobile communication terminal to correctly perceive an event occurred during the service when an event occurs while a service picture is displayed on the mobile communication terminal.

According to exemplary embodiments of the present invention, a command input is interrupted through a button provided to a mobile communication terminal until a final event picture is displayed when an event occurs while a service picture is displayed on the mobile communication terminal, thereby preventing an unintended event processing or an erroneous operation due to an erroneous button manipulation when the event occurs.

According to an embodiment of the invention, there is provided an apparatus for forming an event picture in a mobile communication terminal, the apparatus comprising an event processing module for notifying event occurrence information when any event occurs under state that a service picture is displayed on a screen of the mobile communication terminal; a picture backup module for backing up the service picture displayed on the terminal screen when it is notified of the event occurrence information; and a picture synthesizing section for overlapping an event picture over the backed up service picture to display the event picture on the terminal screen.

According to another embodiment of the invention, there is provided a method for forming an event picture in a mobile communication terminal, the method comprising processes of checking whether an event occurs under state that a service picture is displayed on a screen of the mobile communication terminal; backing up the service picture when the event occurs as the check result; and overlapping an event occurrence picture over the backed up service picture to display the event picture on the terminal screen.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE ILLUSTRATED EMBODIMENTS

Hereinafter, exemplary embodiments of the present invention will be described with reference to the accompanying drawings. In the following description, a detailed description of known functions and configurations incorporated herein will be omitted when it may make the subject matter unclear.

Figure 1:
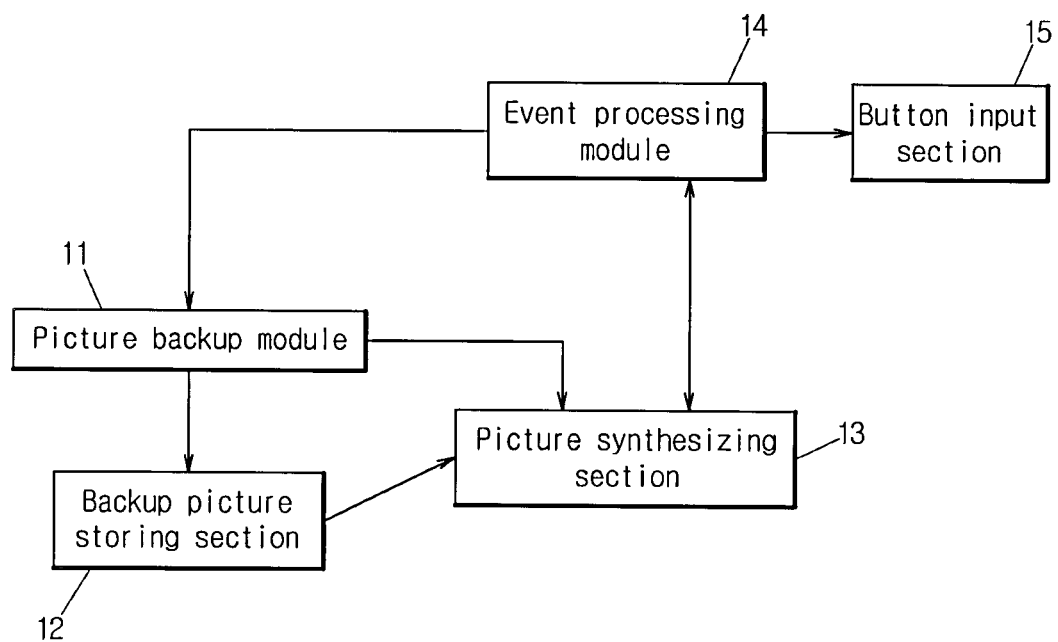
FIG. 1 is a block diagram showing an apparatus for forming an event picture in a mobile communication terminal, according to an embodiment of the invention.

As shown in FIG. 1, an apparatus for forming an event picture when an event occurs in a mobile communication terminal according to an embodiment of the invention may comprise a picture backup module 11, a backup picture storing section 12, a picture synthesizing section 13, an event processing module 14 and a button input section 15.

The picture backup module 11 backs up a service picture currently displayed on a LCD screen of the terminal into the backup picture storing section 12 when it is notified of an event occurrence. The backup picture storing section 12 serves to temporarily store the picture backed up by the picture backup module 11.

The picture synthesizing section 13 overlaps an event picture over the backup picture stored in the backup picture storing section 12 under control of the event processing module 14 to display the event picture on the LCD screen. After displaying a final event picture, it notifies the event processing module 14 of the result. At this time, a picture synthesis transparency of the backup picture and the event picture may be changed at a periodic time with a timer so that the picture displayed on the terminal screen is gradually displayed from the backup picture to the event picture.

The event processing module 14 notifies the picture backup module 11 of an event occurrence so that the picture backup module 11 backs up a current service picture, when any event occurs in the state that the service picture is displayed on the LCD screen. At this time, the event processing module 14 controls the button input section 15 to interrupt a command input through the buttons of the terminal and transmits the event picture information to the picture synthesizing section 13 to synthesize the backup picture and the event picture. After that, when it is notified that a final event picture is displayed by the picture synthesizing section 13, the event processing module 14 controls the button input section 15 to enable the command input through the buttons again and performs a corresponding event processing.

The button input section 15 comprises a keypad and senses an operation of a number, character or function buttons used for a variety of services provided in the terminal to receive the button information. In addition, the button input section 15 serves to temporarily interrupt a command input through the buttons under control of the event processing module 14.

Figure 2:
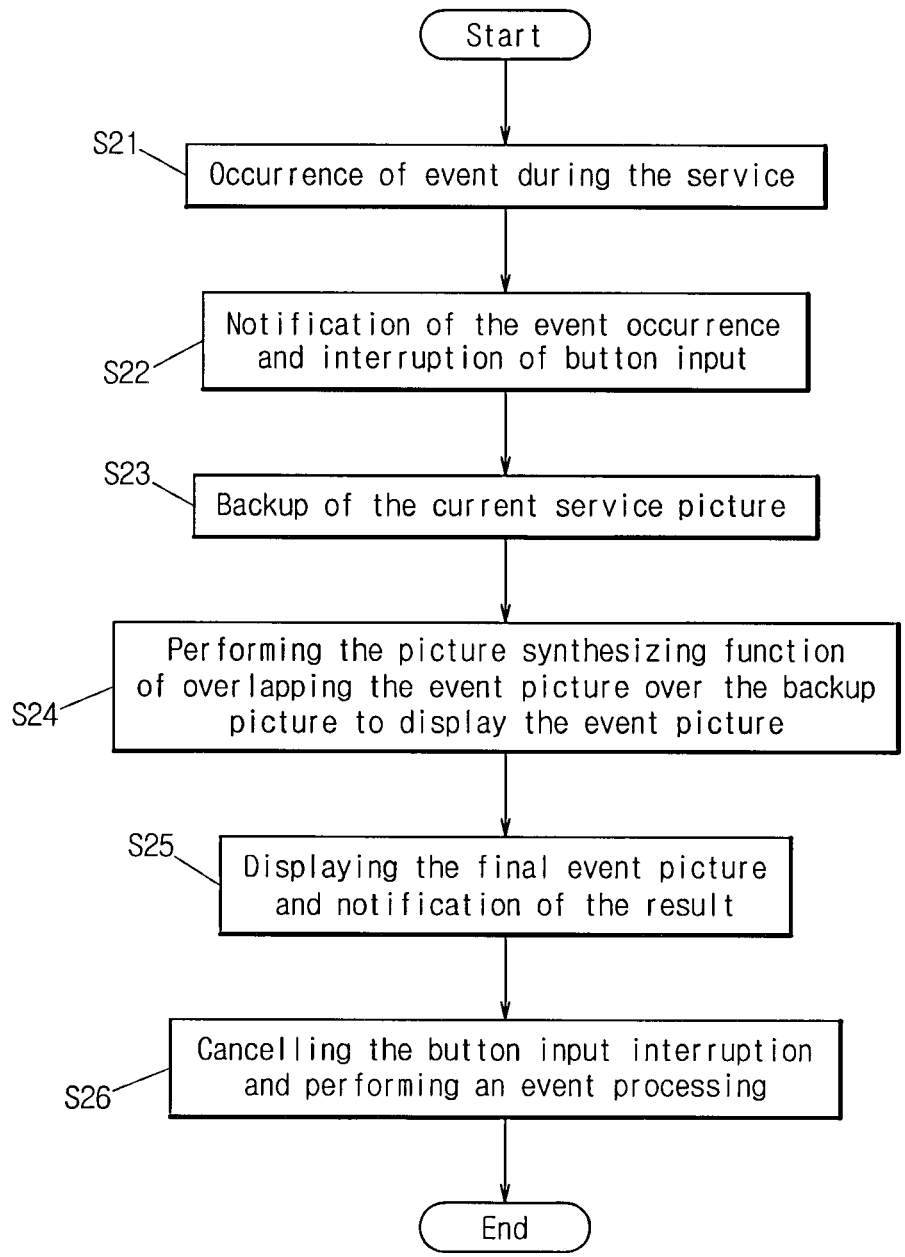
FIG. 2 is a flow chart for illustrating an operation for forming an event picture in a mobile communication terminal, according to an embodiment of the invention.
Figure 3:
FIG. 3 is an exemplary view showing a picture synthesis overlapping an event picture over a service picture according to an embodiment of the invention.

Hereinafter, a method for forming an event picture when an event occurs in a mobile communication terminal according to an embodiment of the invention will be specifically described with reference to FIGS. 2 and 3.

First, when a user of the terminal performs a button input operation, the button input section 15 senses the button operation and receives corresponding button information. When any event occurs such as call reception, alarm or message reception while the terminal user uses a service through the button input (S21), the event processing module 14 notifies the picture backup module 11 of the event occurrence and controls the button input section 15 to interrupt the command input through the buttons (S22).

At this time, the picture backup module 11, which is notified of the event occurrence from the event processing module 14, backs up the service picture being currently displayed on the LCD screen of the terminal in the backup picture storing section 12. For example, it is assumed that the terminal user performs a button operation and thus a picture for setting service as shown in FIG. 3B is displayed on the LCD screen. When the picture backup module 11 is notified of a call reception event occurrence from the event processing module 14 while the service picture is being displayed, the picture backup module 11 backs up and stores the picture setting service picture (in FIG. 3B), which is the current service picture, in the backup picture storing section 12 (S23).

The event processing module 14 transmits the event picture information to the picture synthesizing section 13. Thereby, the picture synthesizing section 13 overlaps the event picture over the backup picture, which is the service picture stored in the backup picture storing section 12, thereby displaying the event picture on the terminal screen (S24). At this time, a picture synthesis transparency between the backup picture (FIG. 3B) and the event picture (FIG. 3G) may be changed at a periodic time with a timer so that the event picture is gradually displayed on the LCD screen. For example, as shown in FIGS. 3B to 3G, an overlapping percent of the event 'picture over the backup picture is changed by 20%, 40%, 60% and 80% so that the picture displayed on the LCD screen is gradually displayed into the event picture.

After that, the picture synthesizing section 13 displays a call reception notifying picture, which is a final event picture as shown in FIG. 3G, on the terminal screen and then notifies the event processing module 14 of a result of the final event picture display (S25). When the event processing module 14 is notified that the final event picture is displayed on the LCD screen, it controls the button input section 15 to cancel the interruption of the button input through the keypad, thereby enabling the button input again. Then, as certain buttons are inputted, it performs a corresponding event processing (S26).

As described above, according to the embodiments of the invention, when any event occurs while a service picture is displayed on the terminal, the event picture is overlapped over the current service picture to gradually display the event picture. Accordingly, the terminal user can correctly perceive the event occurred during the service. In addition, when the event occurs, a command input through the buttons is interrupted until a final event picture is displayed, so that it is possible to prevent an unintended erroneous operation due to an erroneous button manipulation when the event occurs.

While the invention has been shown and described with reference to certain exemplary embodiments thereof, it will be understood by those skilled in the art that various changes in form and details may be made thereto without departing from the spirit and scope of the invention as defined by the appended claims and their equivalents.

What is claimed is:

1. A method for displaying an event notification in a mobile communication terminal, comprising:
   displaying a current service picture on a screen of the mobile communication terminal;
   overlapping translucently the event notification over the current service picture on the screen in response to an event occurrence; and
   removing the event notification from the screen automatically or according to a received user input.

2. The method according to claim 1, wherein the overlapping translucently comprises changing transparency of at least one of the current service picture and the event notification according to a time interval.

3. The method according to claim 1, further comprising storing the current service picture in response to an event occurrence.

4. The method according to claim 1, further comprising interrupting a command inputted to the mobile communication terminal in response to an event occurrence.

5. The method according to claim 4, further comprising canceling the interruption of the command if a final event notification is displayed on the screen.

6. An apparatus to display an event notification in a mobile communication terminal, comprising:
   a display section to display a current service picture on a screen of the mobile communication terminal;
   a picture synthesizing section to overlap translucently the event notification over the current service picture on the screen in response to an event occurrence; and
   a removing section to remove the event notification from the screen automatically or according to a received user input.

7. The apparatus according to claim 6, wherein the picture synthesizing section changes the transparency of at least one of the current service picture and the event notification according to a time interval.

8. The apparatus according to claim 6, further comprising a picture backup module to store the current service picture in response to an event occurrence.

9. The apparatus according to claim 8, further comprising an event processing module to indicate the event occurrence to the picture backup module if the event occurs while the current service picture is displayed on the screen.

10. The apparatus according to claim 6, further comprising an input section to interrupt a command inputted to the mobile communication terminal in response to an event occurrence.

11. The apparatus according to claim 10, wherein the input section cancels the interruption of the command if a final event notification is displayed on the screen.

12. An apparatus to display an event notification in a mobile communication terminal, comprising:
   a display section to display a current service picture on a screen of the mobile communication terminal;
   a picture backup module to store the current service picture if an event occurs;
   an event processing module to indicate the event occurrence to the picture backup module; and
   a picture synthesizing section to overlap translucently the event notification over the current service picture on the screen if the event occurs,
   wherein the picture synthesizing section changes the transparency between the current service picture and the event notification according to a time interval.

13. The apparatus according to claim 12, further comprising a removing section to remove the event notification from the screen automatically or according to a received user input.

\* \* \* \* \*